United States Patent [19]

Taniguchi et al.

[11] Patent Number: 4,988,034
[45] Date of Patent: Jan. 29, 1991

[54] MECHANICAL PART HAVING CERAMIC AND METAL SECTIONS SOLDERED TOGETHER AND METHOD OF PRODUCING SAME

[75] Inventors: Masato Taniguchi; Harumi Suzuki, both of Aichi, Japan

[73] Assignee: NGK Spark Plug Co., Ltd., Nagoya, Japan

[21] Appl. No.: 287,158

[22] Filed: Dec. 21, 1988

[30] Foreign Application Priority Data

Dec. 25, 1987 [JP] Japan .................. 62-195667[U]

[51] Int. Cl.⁵ .................. B23K 1/20; B23K 103/16
[52] U.S. Cl. .................. 228/122; 228/124; 416/241 B
[58] Field of Search .......... 228/121, 122, 124, 236.12; 416/241 B

[56] References Cited

U.S. PATENT DOCUMENTS 3,281,174 10/1966 Heil ........................ 228/122
3,923,551 12/1975 Purdy ...................... 228/122
4,645,117 2/1987 Knapp et al. ............... 228/124

FOREIGN PATENT DOCUMENTS

| 232692 | 12/1984 | Japan | 228/122 |
| 42283 | 3/1985 | Japan . | |
| 65776 | 4/1985 | Japan | 228/263.12 |
| 82267 | 5/1985 | Japan | 228/263.12 |
| 141681 | 7/1985 | Japan | 228/263.12 |
| 155577 | 8/1985 | Japan | 228/263.12 |
| 260482 | 12/1985 | Japan | 228/263.12 |
| 219766 | 9/1986 | Japan | 228/263.12 |

*Primary Examiner*—Sam Heinrich
*Attorney, Agent, or Firm*—Foley & Lardner, Schwartz, Jeffery, Schwaab, Mack, Blumenthal & Evans

[57] ABSTRACT

A mechanical part has a metal main body and a ceramic tip having a joining surface at which it is joined to the metal main body. The ceramic tip has a chamferred edge at the periphery of the joining surface. The joining surface and the chamferred edge are metallized prior to joining of the joining surface to the metal main body.

10 Claims, 1 Drawing Sheet

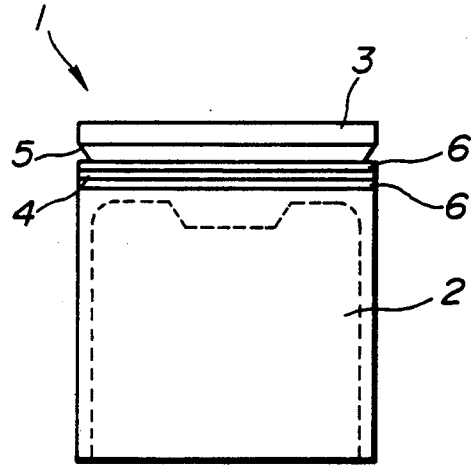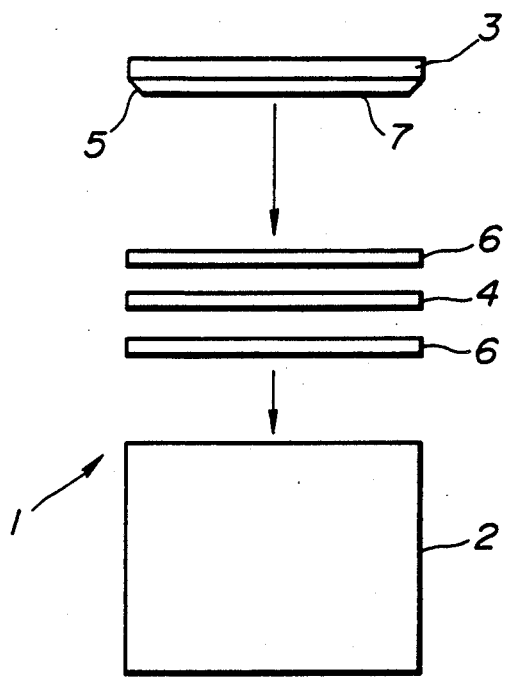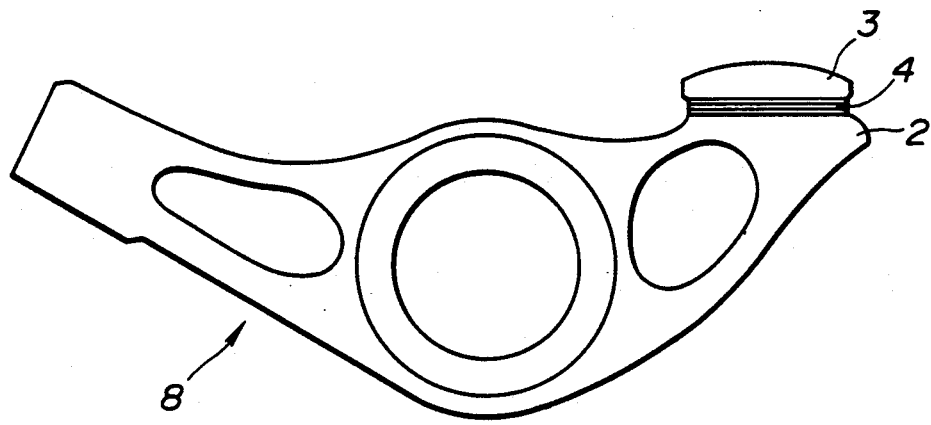

4,988,034

MECHANICAL PART HAVING CERAMIC AND METAL SECTIONS SOLDERED TOGETHER AND METHOD OF PRODUCING SAME

BACKGROUND OF THE INVENTION

I. Field of the Invention

The present invention relates to a mechanical part having ceramic and metal sections soldered together. The present invention further relates to a method of producing such a ceramic-metal composite mechanical part.

II. Description of the Prior Art

Ceramics have excellent heat and wear resisting properties and have recently been used in many cases in the form of ceramic-metal composite bodies in which a ceramic section is soldered to a metal section, due to its mechanical characteristics. For example, a rocker arm for an internal combustion engine has at its valve contacting portion a ceramic tip which is soldered to a metal main body. Prior to the soldering, the joining surface of the ceramic tip to be joined with the metal main body is metallized for example by vacuum evaporation.

The ceramic tip is metallized only at the joining surface. Thus, when an excess amount of solder is used for the purpose of removing the pores and foreign matter from the joint between the ceramic tip and metal main body, run solder is caused on the side surface of the main body as well as an irregular thickness of the solder layer and therefore an inclination of the ceramic tip. Since it is necessary to attain a certain degree of parallelization or straightness of the ceramic tip relative to the reference surface of the metal main body, the sliding surface of the ceramic tip needs to be ground to size with respect to the reference surface after the ceramic tip is soldered to the metal main body. Furthermore it is necessary to carry out a machining for removing the run solder, thus resulting in increased manufacturing cost. Further, if the amount of solder is reduced as small as possible, the pores and foreign matters cannot be removed sufficiently, thus resulting in considerably reduced strength of the soldered joint between the ceramic tip and metal main body.

SUMMARY OF THE INVENTION

It is accordingly an object of the present invention to provide an improved ceramics-metal composite mechanical part which need not to be ground to size after soldering and therefore is cheap in price.

It is another object of the present invention to provide an improved ceramics-metal composite mechanical part of the above described character which can eliminate run solder and therefore a machining process for removing same.

It is a further object of the present invention to provide an improved ceramics-metal composite mechanical part of the above described character which has an excellent mechanical strength.

It is a further object of the present invention to provide a method of producing a ceramics-metal composite mechanical part of the above described character.

In accordance with the present invention, there is provided a part which comprises a metal section and a ceramic section. The ceramic section has a joining surface at which it is soldered to the metal section. The ceramic section further has a chamferred edge at the periphery of the joining surface. The joining surface and the chamferred edge are metallized prior to soldering of the joining surface to the metal section.

In accordance with the present invention, there is also provided a method of soldering a ceramic section of a part to a metal section of same, which comprises preparing the metal section, preparing the ceramic section having a joining surface to be joined with the metal section, providing a chamferred edge to the periphery of the joining surface, providing metallization to the joining surface and the chamferred edge, and soldering the joining surface of the ceramic section to the metal section.

The above structure and method are effective for solving the above noted problems inherent in the prior art device.

BRIEF DESCRIPTION OF THE DRAWINGS

FIG. 1 is a side elevational view of a valve lifter according to an embodiment of the present invention;

FIG. 2 is an exploded view of the valve lifter of FIG. 1; and

FIG. 3 is a side elevational view of a rocker arm according to another embodiment of the present invention.

DESCRIPTION OF THE PREFERRED EMBODIMENTS

Referring to FIGS. 1 and 2, a valve lifter according to an embodiment of the present invention is generally indicated by 1 and mainly consists of a main body 2 made of metal, a tip 3 made of ceramics and a plate 4 made of copper and adapted to serve as a buffer member. The ceramic tip 3 is soldered to an end of the metal main body 2 by interposing therebetween the copper plate 4 and in such a way that silver solder layers 6 and 6 are formed between the ceramic tip 3 and the copper plate 4 and between the copper plate 4 and the metal main body 2, respectively.

More specifically, the tip 3 is made of silicon nitride ($Si_3N_4$) and sized so as to be 20 mm in diameter and 2 mm thick. The ceramic tip 3 has on one side thereof a planar joining surface 7 to be joined with the above described planar end of the metal main body 2 and is provided with a chamferred or bevelled edge 5 of 0.5 mm width at the periphery of the joining surface 7. The joining surface 7 and the surface of the chamferred edge 5 are metallized with a Ti coating of 1000 Å thickness, a Mo coating of 1000 Å thickness and a Cu coating of 2000 Å thickness by vacuum evaporation.

The ceramic tip 3 is soldered to the metal main body 2 with a silver solder material of 0.05 mm thickness while being held in the atmosphere of $H_2$. By this, the silver solder 6 is applied uniformly to the chamferred edge 5 to be fixedly held thereby as well as to the joining surface 7, thus making it possible to prevent the ceramic tip 3 from moving or inclining out of position and therefore eliminating the necessity of grinding to size the outer surface of the tip 3 for contact with a cam (not shown) after soldering. Furthermore, since there is not any run solder on the circumferential surface of the metal main body 2, a machining process for removing the run solder is unnecessary.

In another embodiment shown in FIG. 3, the ceramic tip 3 is rectangular in shape and sized so as to be 15 mm wide, 16 mm long and 5 mm thick. The tip 3 is made of $Si_3N_4$ and has a joining surface 7. The joining surface 7 is metallized so as to have a Ti coasting of 1000 Å thickness, a Mo coating of 2000 Å thickness and a Cu coating of 3000 Å thickness. Thereafter, the ceramic tip 3 is soldered to the metal main body 2 with a silver solder material of 30 μm thickness and thereby constitutes a rocker arm. In this instance, the ceramic tip 3 is formed at the periphery of the joining surface 7 with a chamferred or bevelled edge of 0.5 mm width.

A test was conducted to measure the breakage strengths of the samples of the ceramic-metal composite mechanical parts one kind of which is provided with the above described chamferred edge and the other kind is not, under the condition that a static load is applied continuosly to the samples at the speed of 0.5 mm/min. The test result is shown in the table 1. From this table, it will be apparent that the mechanical part that is provided with the above described chamferred edge and metallization is superior in strength to the prior art mechanical part which is not provided with such a chamferred edge and metallization.

TABLE 1

| Number of Tests | Breakage Strength (kgf) | |
|---|---|---|
| | Chamfer & Metallization provided | Chamfer & Metallization not provided |
| 1 | 3500 | 3000 |
| 2 | 3800 | 2900 |
| 3 | 3900 | 3300 |
| 4 | 3600 | 3400 |
| 5 | 4200 | 3000 |
| 6 | 4100 | 2800 |
| 7 | 3600 | 3100 |
| 8 | 4000 | 3200 |
| 9 | 3900 | 2900 |
| 10 | 3800 | 3100 |
| Average | 3800 | 3100 |

What is claimed is:

1. A part comprising:
   a metal section; and
   a ceramic section having a joining surface at which it is soldered to said metal section;
   said ceramic section having a chamferred edge at the periphery of said joining surface;
   said joining surface and said chamferred edge being metallized prior to soldering of said joining surface to said metal section.

2. A ceramic-metal composite part comprising:
   a metal section;
   a ceramic section having a planar joining surface at which it is soldered to said metal section;
   said ceramic section having a chamferred edge at the periphery of said joining surface;
   said joining surface and said chamferred edge being metallized prior to soldering of said joining surface to said metal section; and
   a copper plate interposed between said ceramic section and metal section.

3. A method of soldering a ceramic section of a part to a metal section of same, comprising the steps of
   preparing said metal section having a planar end;
   preparing said ceramic section having a planar joining surface to be joined with said end of said metal section;
   providing a chamferred edge to the periphery of said joining surface;
   providing metallization to said joining surface and said chamferred edge; and
   soldering said joining surface of said ceramic section to said end of said metal section.

4. A method as set forth in claim 3 wherein said soldering comprises preparing a copper plate and interposing said copper plate between said ceramic section and said metal section.

5. A part as claimed in claim 1, wherein said part is a valve lifter or a rocker arm.

6. A ceramic-metal composite part as claimed in claim 2, wherein said part is a valve lifter or a rocker arm.

7. A method as claimed in claim 3, wherein said metallization step comprises metallization by vacuum evaporation.

8. A method as claimed in claim 7, wherein said metallization step comprises consecutive deposition by vacuum evaporation of a titanium layer, a molybdenum layer and a copper layer.

9. A ceramic-metal composite part produced by the method of claim 3.

10. A ceramic-metal composite part produced by the method of claim 8.

* * * * *